Aug. 17, 1954 S. HORBACH 2,686,883
OSCILLATING DISPLAY MOTOR
Filed April 1, 1953 3 Sheets-Sheet 1
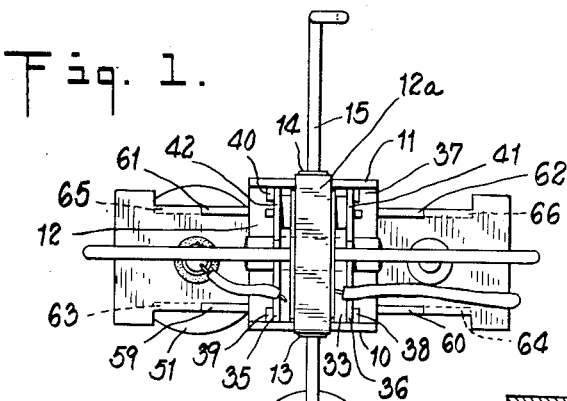
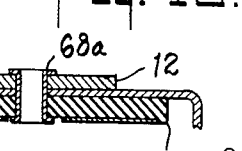
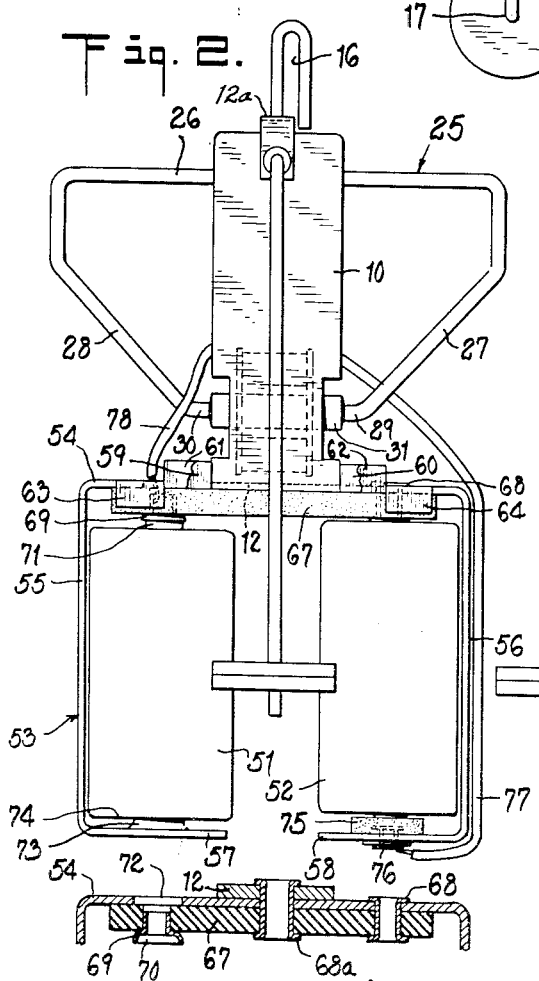
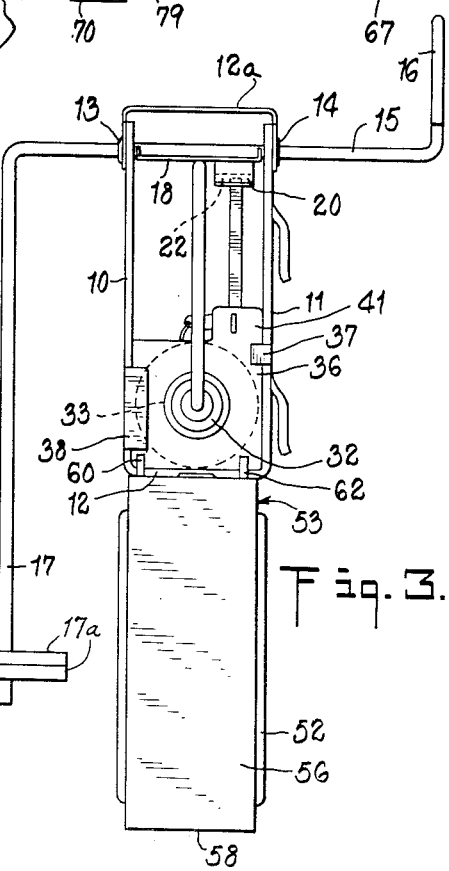
INVENTOR.
STEPHEN HORBACH
BY
John J. Rogan
ATTORNEY Aug. 17, 1954

S. HORBACH 2,686,883

OSCILLATING DISPLAY MOTOR

Filed April 1, 1953

INVENTOR.
STEPHEN HORBACH

BY John J. Rogan
ATTORNEY

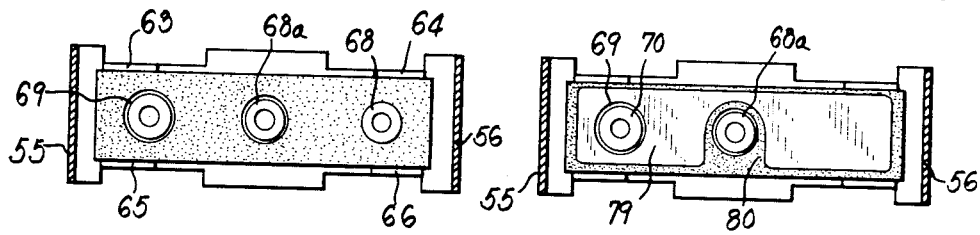

Patented Aug. 17, 1954

2,686,883

UNITED STATES PATENT OFFICE 2,686,883

OSCILLATING DISPLAY MOTOR

Stephen Horbach, Rutherford, N. J.

Application April 1, 1953, Serial No. 346,157

15 Claims. (Cl. 310—39)

This invention relates to oscillating motors and more especially it relates to such motors as are used for oscilating or actuating the movable element or elements of an advertising display or the like.

A principal object of the invention is to provide a more efficient and reliable oscillating motor which can be operated from one or a few small batteries or dry cells over an extended period of time without undue shortening of the useful life of the battery.

Another object is to provide an improved and simplified oscillating motor of the flashlight-battery operated type.

Heretofore, it has been proposed to construct a battery-operated oscillating motor by employing a single reed-like contact which closes the energizing circuit of the field-producing solenoid while a permanent magnet core is passing through the solenoid. I have found that one of the disadvantages of such a construction is that in the rest position of the core and associated parts, there is the likelihood of the circuit remaining closed between the battery and solenoid when the motor is not in use. Ordinarily such motors are not self-starting and require a manual impulse to effect the starting of the oscillations. Consequently, if the parts are in their centralized rest position there is a likelihood of constant drain on the operating battery. When it is remembered that such motors usually employ small dry cells, such, for example, as flashlight batteries, such a condition is undesirable.

Accordingly, I have devised a battery-operated oscillating motor which is so arranged that when the parts are in their centralized rest position the circuit to the field solenoid is always open.

A feature of the invention relates to a battery-operated oscillating motor employing a single field solenoid and a single permanent magnet armature or core, in conjunction with a special contact arrangement to exercise a double attractive effect on the core just before it enters the solenoid. By this arrangement, the core is subjected to the attractive force of the solenoid at the most effective part of its arc of travel.

A further feature relates to a battery-operated oscillating motor employing a single reed-like central contact, together with a pair of oscillating contacts which close an attraction circuit between the field-producing solenoid and the armature. The oscillatory contacts are physically spaced from each other so as to insure that the reed contact engages the respective oscillating contact only at the precise instant that the core is about to enter the solenoid, to exert an attractive impulse thereon.

Another feature relates to a battery-operated oscillating motor employing a single central contact reed, together with a pair of physically spaced oscillating contacts which are provided with an intervening block of insulation whereby each contact of the pair engages the reed contact only during one direction of oscillation, and the said block also acts as a cleaning member for the reed contact.

Another feature relates to a compact battery operated oscillating motor having a frame which is arranged to act as a retainer clip for one or more dry cells and whereby the cells can be, with minor change, easily connected in series or in parallel with the solenoid.

Another feature relates to an improved and simplified battery-operated oscillating motor having means for readily counterbalancing the oscillatory load to be operated by the motor.

Another feature relates to a gum-free lubricant which has incorporated therein powdered graphite so as to provide an electrical conductive lubricant which does not substantially decrease its electrical conductivity or lubricating properties during continued use.

A further feature relates to the novel organization, arrangement and relative location and interconnection of parts which cooperate to provide an improved and simplified battery-operated display motor.

Other features and advantages not particularly enumerated will be apparent after a consideration of the following descriptions and the appended claims.

In the drawing, which shows, by way of example, certain preferred embodiments,

Fig. 1 is a top plan view of the motor.

Fig. 2 is a front elevation of Fig. 1.

Fig. 3 is a right-hand side view of Fig. 2.

Fig. 4 is an enlarged cross-sectional view of part of the battery contacting and holding frame of the motor.

Fig. 7 is a bottom view of Fig. 4.

Fig. 8 is an enlarged side view of the reed contact and its mount.

Fig. 9 is a front view of the reed contact and its mount.

Fig. 10 is a magnified view of the dual oscillating contact.

Fig. 11 is a modification of Fig. 10.

Fig. 12 is a schematic wiring diagram showing how two dry cells are connected in parallel with the motor solenoid winding using the battery frame of Figs. 2, 4 and 7.

Fig. 13 is a cross-sectional view similar to Fig. 4, but showing a modification of the battery contact and holding frame using a printed circuit conductor.

Fig. 14 is a bottom view of Fig. 13.

Fig. 15 is a schematic wiring diagram showing the batteries connected in series using the modified battery frame of Figs. 13 and 14.

Figure 5:
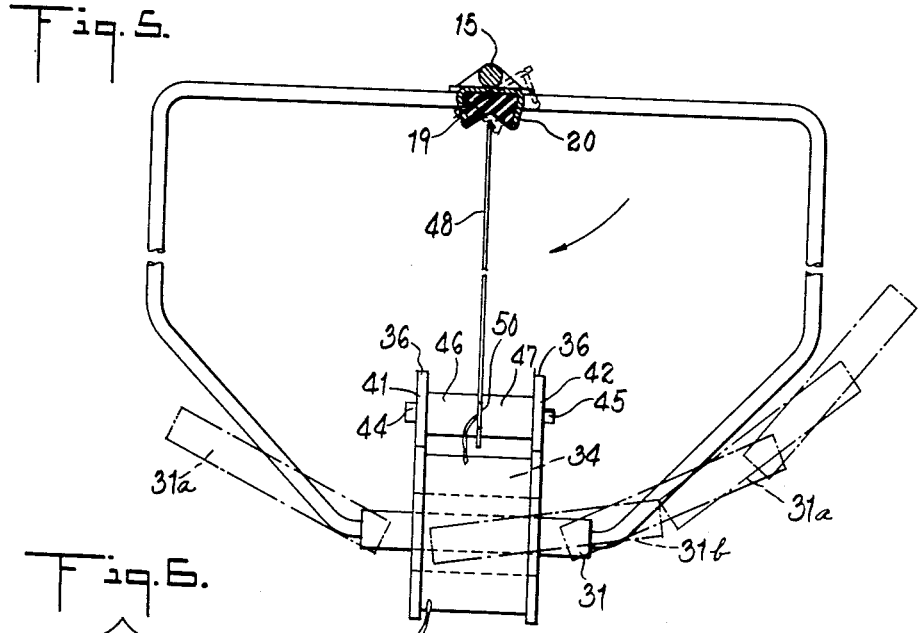
Fig. 5 is a view showing the motor armature or core in different positions used in explaining the invention.

While the motor according to the invention finds its primary utility in the actuation of advertising displays, it will be clear that the motor is capable of use in other fields. However, since there is a large demand for display operating motors capable of continued operation from a few dry cells, the motor shown in the drawing is especially designed with that in view. Referring more particularly to Figs. 1 to 3 of the drawing, the motor comprises a first U-shaped sheet metal frame having vertical side walls 10, 11, joined by horizontal bottom wall 12. Walls 10 and 11 are held in fixed spaced parallelism at their top ends by a rigid metal tie piece 12a whose downwardly extending ends are fastened, for example by metal eyelets 13, 14, to the side walls 10, 11. The eyelets 13, 14, serve as bearings for the horizontally extending motor shaft 15 to be oscillated. For this purpose, walls 10 and 11, like the ends of member 12, have aligned openings to receive the eyelets 13, 14. The shaft 15 may form an integral part of a bendable wire which at one end is bent at right angles upwardly and to U-shape form to constitute a holding clip 16 to which suitable display material (not shown) may be attached. Shaft 15 has its other end bent downwardly to form an arm 17 which may be bent to act as a counterweight. If desired, one or more weights 17a can be adjustably attached along the length of arm 17. The stock out of which arm 17 is made is preferably readily bendable so as to facilitate the counterweighting of the advertising display which is attached to clip 16.

Rigidly fastened to shaft 15 between walls 10 and 11 is a flat metal strip 18, the ends of which are bent upwardly and with a small clearance with respect to the walls 10 and 11. The member 18, therefore, prevents the shaft 15 sliding substantially with respect to the frame. When the parts are at rest, the strip 18 resumes a horizontal plane position. Fastened as by soldering or welding to strip 18 is a dual oscillating contact assembly which is shown in magnified view in Fig. 10. It may comprise a pair of downwardly descending spaced metal lugs 19, 20, forming a downwardly facing U with the space between the inner surfaces of the U provided with a filling of insulation 21. The insulation 21 should preferably be of a hard smooth material such as ceramic or porcelain which forms a solid block between the inner faces of contact lugs 19, 20. Preferably, the lugs 19, 20, are bent towards each other, and each being bent approximately 15 degrees less than a right angle with respect to the strip 18. As shown more clearly in Fig. 10, the insulation 21 extends below the lower edges 23 and 24 of the lugs 19 and 20, the purpose of which will be described hereinbelow. Likewise, the insulation block 21 has a central reentrant groove or cutout 22 whose purpose will be described hereinbelow. If desired, the lugs 19 and 20 may be formed as integral struck-out portions of strip 18. While Fig. 10 shows the groove or reentrant portion 22 triangular, any other shape such as a rounded shape (Fig. 11) may be used.

Fastened, as by soldering or welding to member 18 is a rigid wire loop 25 having a horizontal arm 26 which is bent at its ends to form inclined portions 27, 28, terminating in horizontal end portions 29, 30. Soldered or welded between the ends 29, 30, is a cylindrical permanent magnet core 31 of high efficiency magnetic material, such for example as that sold under the trade name "Alnico V." The core 31 is arranged to move in opposite directions through the cylindrical bore 32 of the solenoid 33. Preferably, the length of the solenoid is substantially less than the length of the core. For example, the core may be approximately twice as long as the solenoid. The solenoid comprises a tubular insulation form around which is wound the solenoid winding 34, and the form carries insulation end flanges 35, 36. For the purpose of firmly anchoring the solenoid in place, the walls 10 and 11 of the motor frame may be provided with struck-up lugs 37—40 which press against the end flanges 35, 36, of the solenoid form.

The flanges 35, 36, have upwardly extending ears 41, 42 (see Figs. 5, 8 and 9) each of which has a small slot to receive a flat metal strip 43. The end 44 of strip 43 is larger than the slot in ear 41 and the opposite end 45 of the strip, after the parts have been assembled, is bent out of the plane of the strip to anchor the strip in place. Thus, the main length of strip 43 is located in a vertical plane. Located between the ears 41, 42, are two ceramic insulator tubes 46, 47, between whose adjacent ends is clamped the reed-like contact spring 48 of Phosphor bronze or other similar material. The lower end of member 48 has a narrow window whose width is approximately the same as the thickness of strip 43 but whose length is somewhat greater than the vertical width of strip 43 so as to permit member 48 to be adjusted vertically for timing purposes to be described hereinbelow.

Figure 6:
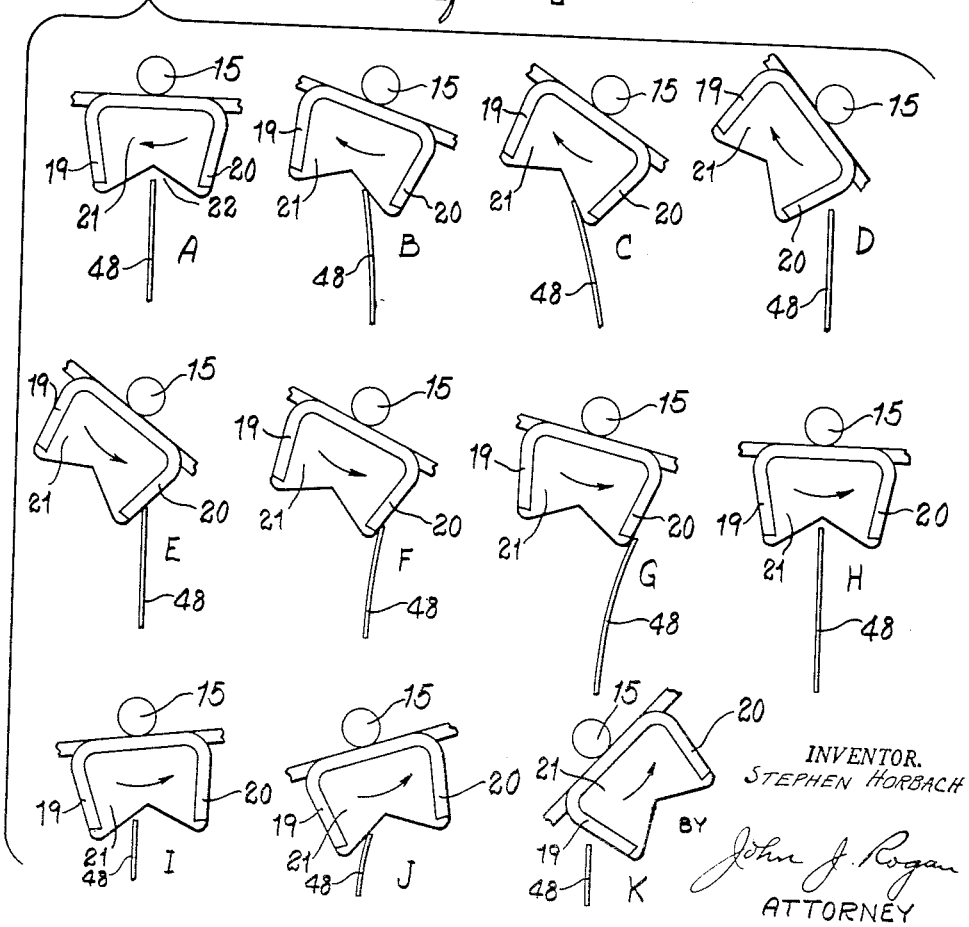
Figs. 6A–6K are diagrammatic views explanatory of successive stages in the oscillating cycle of the motor.

The vertical adjustment of the contact spring 48 is of importance since it enables the timing of closure between member 48 and contacts 19, 20, to be preadjusted to the optimum efficiency as will be explained in connection with the diagrammatic views of Figs. 6A to 6K. It will be understood that member 48 is of sufficiently thin stock to enable its upper end to be deflected, as shown in Figs. 6B, 6C, etc. The lower end of member 48 has an integral lug 50 extending at right angles and serving as a soldering lug for connecting contact spring 48 to one end of the solenoid winding. The circuit to the opposite end of the solenoid winding and to the battery is controlled by the timed engagement between member 48 and the dual contacts 19, 20.

The motor is designed to be operated by one or two dry cells. Merely for explanation it will be assumed that the motor of Figs. 1 to 3 is to be operated with two dry cells 51, 52, to be connected in parallel. For this purpose there is provided a second sheet metal frame 53 having a horizontal arm 54 and vertical arms 55, 56. The ends of arms 55 and 56 terminate in spaced portions 57, 58. The frame 53 is made of spring sheet metal so that it has sufficient spreadable flexibility to permit inserting the cells 51, 52, while firmly anchoring them in place. The frame 53 may be joined as a unit, for example by eyelet 68a, to the bottom wall 12 of the motor frame. The horizontal portion 54 may have a set of four struck-up lugs 59, 60, 61, 62, between which the lower wall 12 of the motor frame is located. The portion 54 may also have four struck-down lugs 63, 64, 65, 66 to receive an insulation strip 67. This strip may be anchored in place by a metal eyelet 68 which also serves as a contact member for the cell 52. Insulation strip 67 also has fastened therein a metal eyelet 69, whose lower end 70 is cup-shaped to receive the central carbon electrode 71 of the cell 51. The portion 54 of the battery frame has an enlarged opening 72 in registry with the eyelet 69 so that the said eyelet does not make any electrical contact with the battery frame. The opposite part 57 of the frame has a struck-up lug 73 which engages the zinc bottom or negative electrode 74 of cell 51. The portion 58 of the battery frame has a slot to tightly receive the ceramic insulator cup 75 which is thus fastened in place with a forced fit.

By this arrangement, metal eyelet 76 is electrically insulated from the battery frame. The ceramic cup 75 is provided with a peripheral groove so that the said cup can be assembled in place through the slotted end of the portion 58 of the frame and it may be held in place by any suitable means or cement. The wire 77 has one end soldered to the eyelet 76 and the other end of this wire is connected to one end of the winding of solenoid 34, as shown in the schematic diagram of Fig. 12. Likewise, the eyelet 69 is connected by a wire 78 to this same end of the solenoid winding. Thus, when the dry cells are inserted in the frame in the relation shown in Fig. 2, they are effectively connected in parallel with each other and their positive terminals are connected to one end of the solenoid winding. The other end of the solenoid winding is connected to the contact spring 48 as shown at 50 in Fig. 5. Since the negative terminals of the cells 51 and 53 are in direct metallic contact with the frame 53 and with the motor frame, they are likewise in direct metallic contact with the contacts 19, 20. However, when the shaft 15 is in its rest position, that is with the permanent magnet core 31 located centrally within the solenoid winding, as shown in the full-line position in Fig. 5, the contact spring 48 is in registry with the cut-out or groove 22 in the insulation block 21. It is not until the shaft 15 is turned sufficiently to the right or to the left that the circuit actually is closed through the solenoid winding.

The motor is especially designed so that the useful life of the battery is preserved as much as possible. This object is accomplished, in general, by two features. One of these is that in the rest position of the parts, as shown in Figs. 2, 6A and 6H, the contact 48 is vertical and is free from engagement with any part of the oscillating contact assembly. Secondly, the duty cycle of contact engagement between the member 48 and the contacts 19, 20, is precisely limited and correlated with the position of the core 31 as it is about to enter the solenoid winding, as represented by the dot-dash position 31a, Fig. 5. Thus, when the core 31 is in the left-hand dot-dash line position 31a shown in Fig. 5, the contact begins between the member 48 and the lug 20. This position is shown in Fig. 6E wherein the shaft 15 is rotating counter-clockwise and the dual contact assembly is moving toward the right so that the contact lug 20 is just engaging the member 48. Likewise, on the return cycle of shaft 15, when the core 31 is in the right-hand dot-dash position 31a shown in Fig. 5, the contact is just about to begin between the member 48 and the contact 19 as illustrated in Fig. 6K. Since the action is identical on both halves of the oscillating cycle a detailed illustration of the sequence during one portion of the cycle is shown in the diagrammatic views of Figs. 6A–6K.

In position 6A, the parts are at rest so that the member 48 is free from engagement with any portions of the dual contact assembly. When it is desired to set the motor in operation, the frame carrying core 31 is manually pushed to its extreme clockwise position. During the initial stages of this motion the member 48 is first engaged by the right-hand inclined face of the insulator block 21. This exerts a wiping and cleaning action on the right-hand flat face and tip of the contact spring 48. This relation is shown diagrammatically in Fig. 6B. In the next stage of the clockwise movement the end and tip of spring 48 wipes along the face of the insulator block 21, as shown in Fig. 6C. When the oscillatory frame has been pushed far enough to its extreme position, as shown in Fig. 6D, the spring 48 flips back to its vertical position and clears the lower edge of the insulating block 21. The weight of the moving parts now causes the armature and shaft 15 with its load to return by gravity in a counterclockwise direction. When the armature 31 reaches the dot-dash line position 31a shown in the left-hand portion of Fig. 5, namely just as the core is about to enter the solenoid, the contact lug 20 engages the contact spring 48 and closes the battery circuit through the solenoid winding 34.

The duration of this closure or duty cycle is determined by the amount of overlap between the tip of spring 48 and the contact lug 20. I have found that this overlap should not exceed a certain amount, for example $\frac{3}{32}$ inch, for greatest efficiency and the batteries attain their greatest useful life when the circuit through the solenoid winding is again broken as the core 31 is approximately half way through the solenoid, represented for example by the dot-dash line position 31b in Fig. 5. In one particular motor it was found that the desired efficiency with optimum battery life, was achieved when the maximum amount of overlap between the contact 48 and the contact 20 and contact 19, was approximately $\frac{3}{32}$ of an inch. It will be understood, of course, that the said overlap merely refers to the length of the portion of the contact 20 that is engaged by the tip of spring 48. Thus, the maximum overlap is shown in Fig. 6E, and the minimum overlap, just before the contact is broken, is shown in Fig. 6A. Fig. 6F shows an intermediate amount of overlap, during which the circuit is closed.

It will be observed that when the shaft 15 is rotated counterclockwise sufficiently to disengage member 48 from contact 20, the said contact, for a very short interval, engages the insulation block and further movement of the shaft in the counterclockwise direction permits the spring 48 to flip back to its rest or neutral position, as shown in Fig. 6H. In this position the core 31 is centered within the solenoid winding but, of course, the circuit through that winding has meanwhile been broken. As the shaft 15 continues in its counterclockwise rotation it finally causes the left-hand inclined edge of the insulator block 21 to engage the member 48 and to exert a wiping and cleaning action on the tip of member 48. Since a substantial electromagnetic impulse has meanwhile been imparted to the core, the shaft 15 continues to rotate in a counterclockwise direction until the dual contact assembly reaches the position shown in Fig. 6K, again allowing the member 48 to flip back to its central or neutral position.

It will be observed, therefore, that the contact lug 20 engages the member 48 only during counterclockwise oscillation of shaft 15, and the contact lug 19 engages the member 48 only during the clockwise oscillation of shaft 15. It has been found possible, therefore, by vertical adjustment of the member 48 in its mount (Figs. 8 and 9) to precisely adjust the timing and degree of contact overlap between the member 48 and the contacts 19 and 20 during their respective duty cycles. Thus, the closure of the solenoid energizing circuit can be timed as the core 31 is about to enter the solenoid, and the circuit is opened when the core is approximately half way through the solenoid, as represented by the dot-dash position 31b. In accordance with the present invention, the polarity of the core 31 is arranged with respect to the direction current flow in winding 34, so that when the circuit is closed through the solenoid winding, as above described, an attractive force or impulse is exerted on the core 31, this impulse being the same for each direction of oscillation through the core of the solenoid. Furthermore, this attractive force is applied at the most effective portion of the oscillatory movement of the core. It has been found that the best results are obtained when this attractive force is applied as the core is about to enter the solenoid, and when the solenoid circuit is broken when the core is approximately half way into the solenoid.

In some cases it may be required to connect the cells 51, 52, in series instead of in parallel. In that case, the insulator strip 67 is fastened to the battery frame member 54 by the center eyelet 68a (see Fig. 7) and the metal cup contact 70 is also carried by the strip 67 but insulated from the frame as in Figs. 2 and 4. The lower face of insulator strip 67 has printed thereon a metallized conductive coating 79, which is in conductive contact with the contact cup 70. However, the printed coating does not touch the eyelet 68a. Therefore, when the cells 51, 52, are inserted in the battery frame as shown in Fig. 2, the positive or carbon electrode of cell 51 is connected through printed strip 79 to the negative or zinc electrode of cell 52. In effect therefore, the cell 52 is insulated at both terminals from the battery frame. The wire 77 is connected to one end of the solenoid winding and the negative pole of cell 51 is connected to the frame, thus connecting the cells 51 and 52 in series with each other and with the solenoid winding under control of the members 48, 19 and 20.

I have found that the useful life of the operating batteries can be greatly extended if a special lubricant is provided between the shaft 15 and the eyelets 13 and 14. This lubricant should be gum-free and made from a high viscosity petroleum oil mixed with powdered graphite in a proportion of about 70% graphite solids by volume to approximately 30% petroleum oil by volume. The petroleum oil may, for example, be an oil sold under the trade name "Teresso," made by Standard Oil Company of New Jersey. Likewise, the graphite should be in sufficiently fine powdered form to be of the order of a few microns in particle size. I have found that this lubricant over extended periods of time does not substantially change its electric conductivity and therefore provides the required conductive contact necessary for the battery circuits and does not produce any substantial gummy residues which would tend to increase the resistance to oscillation of the shaft 15.

What is claimed is:

1. A motor of the kind described, comprising a shaft arranged to be oscillated, a magnet core connected to said shaft for oscillatory movement therewith, a stationary solenoid, and means to cyclically and recurrently energize said solenoid to attract said core as it approaches the opposite ends of the solenoid during its oscillatory movement, the last-mentioned means including a flexible contact finger stationarily mounted with respect to said shaft, a movable contact member having a pair of spaced contact surfaces connected for oscillation as a unit with said shaft, and insulation means for limiting the conductive engagement of each of said movable contacts with said single flexible contact to one respective direction of oscillation of said shaft.

2. A motor of the kind described, comprising a shaft arranged to be oscillated, a permanent magnet core connected to said shaft for oscillatory movement therewith, a stationary solenoid, and means to cyclically and recurrently energize said solenoid to attract said core as it approaches the opposite ends of the solenoid during its oscillatory movement, the last-mentioned means including a single flexible contact finger stationarily mounted with respect to said shaft, a movable contact member having a pair of spaced contact surfaces connected with said shaft for oscillation therewith, said pair of contacts being symmetrically arranged in spaced relation on opposite sides of said fixed contact when the core is in a central rest position, and insulator means to cause each contact of said pair to conductively engage said fixed contact during only one respective direction of oscillation of said shaft.

3. A motor of the kind described, comprising a shaft arranged to be oscillated, a permanent magnet core connected to said shaft for oscillatory movement therewith, a stationary solenoid for attracting said core each time the core approaches the solenoid at its opposite ends, and means to time the cyclical energization of said solenoid with said approach of said core, the last-mentioned means comprising a single flexible contact finger stationarily mounted with respect to said shaft and solenoid, dual contact means having oppositely disposed contact faces each located in spaced relation to one side of said flexible contact when said core is in a central position with respect to said solenoid, and insulation means for said contact faces for limiting the conductive engagement of each face with said flexible contact during only one respective direction of oscillation of said shaft.

4. A motor according to claim 3, in which said dual contact means comprises a U-shaped metal member attached to said shaft.

5. A motor according to claim 3, in which said dual contact means comprises a U-shaped metal member attached to said shaft and with the inner faces of said U-shaped metal member and the lower edges thereof provided with insulation.

6. A motor of the kind described, comprising a shaft arranged to be oscillated, a permanent magnet core connected to said shaft for oscillatory movement therewith, a stationary solenoid, and means to cyclically and recurrently energize said solenoid to attract said core as it approaches the opposite ends of the solenoid during its oscillatory movement, the last-mentioned means including a single flexible contact finger stationarily mounted with respect to said shaft, and an insulating member carried by said shaft and having a pair of spaced contact faces on opposite sides thereof, each contact face conductively engaging said contact finger only during a respective and limited arc of oscillation of said shaft.

7. A motor according to claim 6 in which said contact faces are located with relation to said contact finger so that said faces engage said finger and flex it during said arc of oscillation, the contact between said finger and each contact face beginning approximately when said core is approaching said solenoid and terminating when said core is approximately half way through said solenoid.

8. A motor of the kind described, comprising a shaft arranged to be oscillated, a permanent magnet core connected to said shaft for oscillatory movement therewith, a stationary solenoid, a single flexible contact finger, means to anchor said finger at its lower end and with its upper end extending towards said shaft, a member carried by said shaft and having a pair of spaced metal contact members, said contact members extending downwardly towards the upper end of said finger, insulation means between said contact members, said insulation means having a central reentrant portion to freely accommodate the upper end of said finger when said finger is in an unflexed condition, said finger having a limited predetermined contact overlap with each of said contact members when the shaft is oscillated.

9. An oscillating motor of the kind described, comprising a shaft to be oscillated and arranged to be connected to a load, a permanent magnet core, a wire loop fastened to said shaft and having said core connected between the loop ends, means to counterbalance said shaft and load whereby said core in the rest position is substantially horizontal, a stationarily mounted solenoid for attracting said core and having a horizontal bore through which said core is arranged to pass in opposite directions, a spring finger having its lower end anchored and the upper end extending vertically towards said shaft, a member carried by said shaft and having a pair of spaced contacts thereon for contacting engagement with said spring finger, each contact extending downwardly towards said spring finger so that when the said core is at rest said contacts are equally spaced laterally from the upper end of said spring finger but overlap vertically said upper end of said spring finger, and insulation means between said contacts for causing one contact to engage said spring finger only in one direction of oscillation of the core and in the other contact to engage said spring finger only in the opposite direction of oscillation of said core.

10. An oscillating motor of the kind described, comprising a horizontal shaft to be oscillated, a permanent magnet core, means attaching said core to said shaft so that the length of the core is perpendicular to the length of the shaft, a stationarily mounted solenoid having a bore extending perpendicular to the length of said shaft and through which said core is to be moved in opposite directions in unison with the oscillation of said shaft, a member carried by said shaft and having a pair of spaced contact members attached thereto symmetrically at opposite sides of the rotational axis of said shaft and extending downwardly therefrom, a vertically extending spring finger contact, means to anchor said spring finger contact at its lower end so that when it is unflexed its upper end is in vertical alignment with said shaft and is symmetrically located between said pair of contacts but out of engagement therewith, means to counterbalance said shaft so that in the rest position said contacts are symmetrically spaced on opposite sides of said finger contact, and insulator means carried by said pair of contacts, and having a central hollowed out portion to freely receive the upper end of said spring finger in the rest position, said insulation means also confining the conductive engagement between one of said pair of contacts and said spring finger to one direction of oscillation of the shaft and for confining the conductive engagement between the other contact of said pair and said spring finger to the opposite direction of oscillation of said shaft.

11. An oscillating motor comprising a U-shaped metal frame having the side arms of the U extending vertically, a metal tie member bridging the open ends of the U to maintain them in fixed spaced relation, said tie member being fastened to said side arms by respective metal eyelets, a shaft to be oscillated passing through said eyelets which serve as bearings for said shaft, a member attached to said shaft and carrying a pair of spaced contact surfaces which extend downwardly therefrom in spaced relation, a solenoid, means to anchor said solenoid between said side arms and with its bore extending perpendicular to said shaft, a wire loop attached to said shaft and having downwardly extending arms, a permanent magnet core attached to the opposite ends of said downwardly extending arms, a reed-like motor contact finger, means to support said finger in its unflexed position so that it is centrally located between said contact lugs but insulated therefrom when said contact lugs are in their rest position, and means to adjust the vertical position of said finger to control the amount of contacting overlap between the flexible end of said spring finger and said contact lugs.

12. An oscillating motor comprising a first U-shaped metal frame having the side arms of the U extending vertically, shaft bearings carried by said side arms, a shaft supported for oscillation in said bearings, a movable contact member having a pair of spaced contact lugs attached to said shaft and extending downwardly therefrom in spaced relation to each other, a solenoid, means to anchor said solenoid between said side arms and with the solenoid bore extending perpendicular to said shaft, a wire loop attached to said downwardly extending arms, a permanent magnet core attached to the opposite ends of said arms whereby said core is attracted in opposite directions through said bore when said solenoid is energized, a reed-like metal contact insulatingly supported at its lower end and with its upper end extending between said pair of contact lugs when said core is in its rest position, said upper end being arranged to be conductively engaged alternately by said contact lugs as said shaft is oscillated by the attraction between said solenoid and core and under control of said engagement, means to confine the said engagement between one contact lug and said reed to one direction of oscillation of said shaft and for confining said engagement between the other contact lug and said reed to the opposite direction of oscillation of said shaft, another metal frame attached to the first-mentioned frame and having spreadable flexibility to receive and retain a pair of dry cells, and insulatingly mounted battery contact members carried by said other frame for connecting said cells in parallel with the solenoid winding under control of said reed-like contact and said contact lugs.

13. An oscillating motor according to claim 12, in which said other frame carries an insulator strip which is insulatingly attached to said other frame, said insulator frame having a battery contact which is insulated from said other frame to receive the center electrode of one dry cell, said one dry cell having its other electrode in contact with said other frame, a conductive coating printed on to the surface of said insulator in contact with said contact eyelet, another battery contact insulatingly carried by said frame to receive the center electrode of a second dry cell in inverted relation with respect to the first dry cell whereby said dry cells can be connected in series with the solenoid winding under control of said reed-like contact and said pair of contact lugs.

14. An oscillating motor comprising a U-shaped metal frame having the side arms of the U extending vertically, a metal tie member bridging the open ends of the U to maintain them in fixed spaced relation, said tie member being fastened to said side arms by respective metal eyelets, a wire member having a horizontal oscillatory shaft portion passing through said eyelets which serve as bearings therefor, said wire member having a portion bent upwardly at right angles externally of said frame and terminating in a clip to receive advertising display material, the opposite end of said wire member being bent downwardly externally of said frame and being bendable to act as a counterweight, an electrically conductive lubricant in each of said bearings, comprising a gum-free petroleum lubricant containing powdered graphite in suspension, a solenoid, a permanent magnet connected to said wire member for oscillation therewith, and means to close an attraction circuit for said core each time it approaches the solenoid, the last-mentioned circuit being completed through said bearings and said conductive lubricant.

15. An oscillating motor according to claim 2, in which said pair of movable contacts are rigid and are inclined towards each other and towards said flexible contact finger.

References Cited in the file of this patent
UNITED STATES PATENTS

| Number | Name | Date |
|---|---|---|
| 2,598,954 | Wengel | June 3, 1952 |